United States Patent
Takamori et al.

(10) Patent No.: US 6,606,368 B2
(45) Date of Patent: Aug. 12, 2003

(54) METHOD OF OPERATING NUCLEAR POWER PLANT, NUCLEAR POWER PLANT, AND METHOD OF CONTROLLING WATER CHEMISTRY OF NUCLEAR POWER PLANT

(75) Inventors: Yoshiyuki Takamori, Hitachinaka (JP); Masanori Sakai, Hitachiota (JP); Yamato Asakura, Hitachinaka (JP); Masato Nakamura, Hitachi (JP); Hideyuki Hosokawa, Hitachi (JP); Nagao Suzuki, Tokyo (JP); Kouji Hayashi, Tokyo (JP)

(73) Assignees: Hitachi, Ltd., Tokyo (JP); The Tokyo Electric Power Company, Incorporated, Tokyo (JP)

(*) Notice: Subject to any disclaimer, the term of this patent is extended or adjusted under 35 U.S.C. 154(b) by 5 days.

(21) Appl. No.: 09/839,368

(22) Filed: Apr. 23, 2001

(65) Prior Publication Data

US 2002/0021778 A1 Feb. 21, 2002

(30) Foreign Application Priority Data

Apr. 24, 2000 (JP) ......................... 2000-122124

(51) Int. Cl.$^7$ ........................... G21D 3/00; G21D 3/08; G21C 17/00; G21C 17/02; G21C 17/022
(52) U.S. Cl. ........................ 376/305; 376/306
(58) Field of Search ................... 376/305, 306

(56) References Cited

U.S. PATENT DOCUMENTS 5,465,281 A * 11/1995 Andresen et al. ........... 376/305

FOREIGN PATENT DOCUMENTS

| EP | 0 651 397 | * 5/1995 | ............ 376/305 |
| EP | 0 826 789 | * 3/1996 | ............ 376/305 |
| EP | 0 707 319 | * 4/1996 | ............ 376/305 |
| JP | 7-198893 | 8/1995 | |
| JP | 7-311295 | 11/1995 | |
| JP | 8-43587 | 2/1996 | |
| JP | 8-226994 | 9/1996 | |
| JP | 9-502533 | 3/1997 | |
| JP | 10-197684 | 7/1998 | |
| JP | 2818943 | 8/1998 | |
| WO | 96/00447 | * 1/1996 | ............ 376/305 |

* cited by examiner

Primary Examiner—Michael J. Carone
Assistant Examiner—Jack Keith
(74) Attorney, Agent, or Firm—Mattingly, Stanger & Malur, P.C.

(57) ABSTRACT

In a nuclear power plant, by injecting an amount of hydrogen small enough not to increase a radiation dose rate of the main steam system, ECP of metallic component materials composing a nuclear reactor can be decreased to suppress the potential of occurrence of IGSCC, and the control can be easily performed, and the operating cost can be suppressed to increase. Occurrence of intergranular stress corrosion cracking in metallic component materials in contact with reactor cooling water is suppressed by injecting zirconium hydroxide and hydrogen into the reactor cooling water to decrease the electrochemical corrosion potential of the metallic component materials.

15 Claims, 10 Drawing Sheets

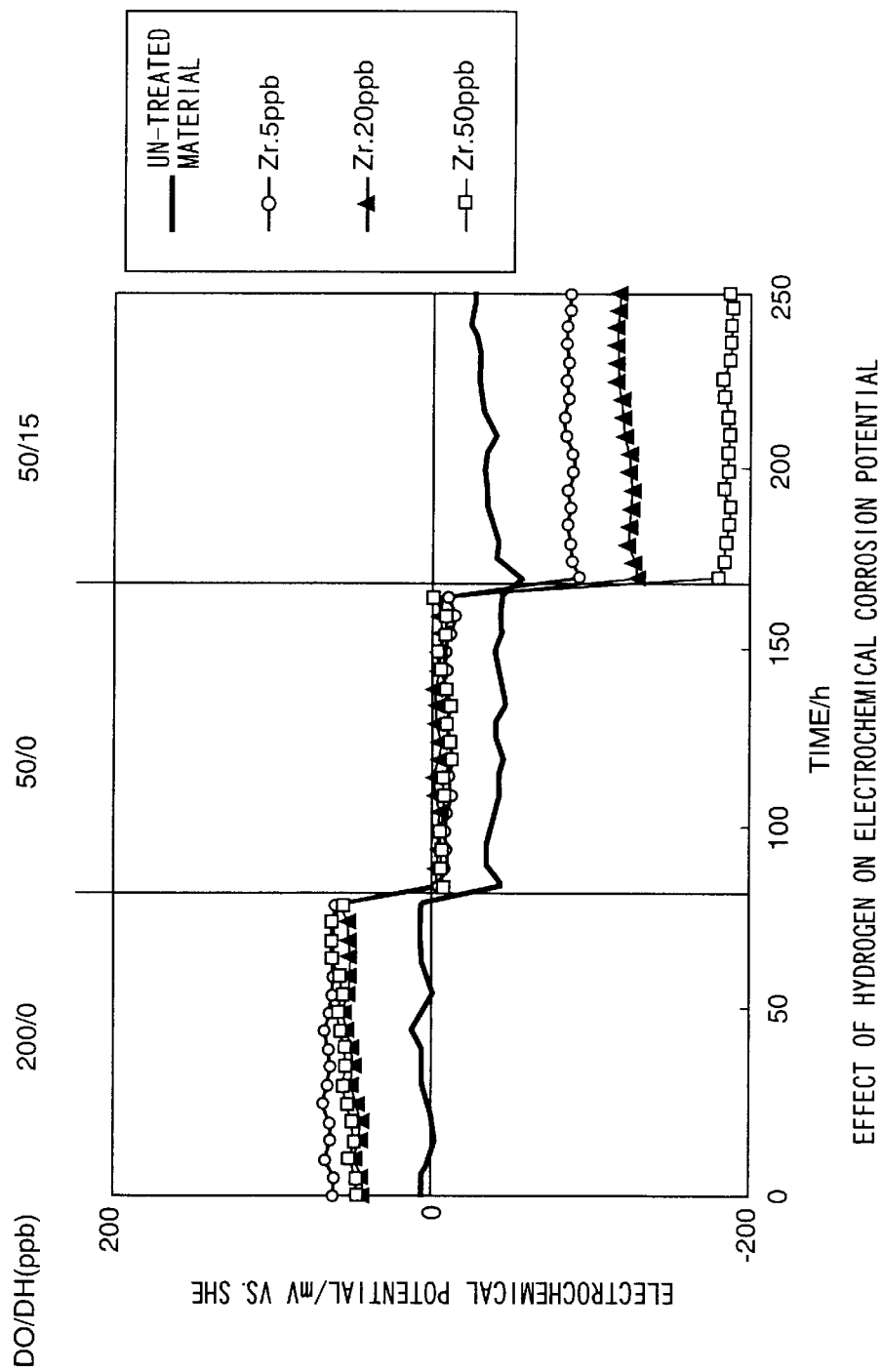

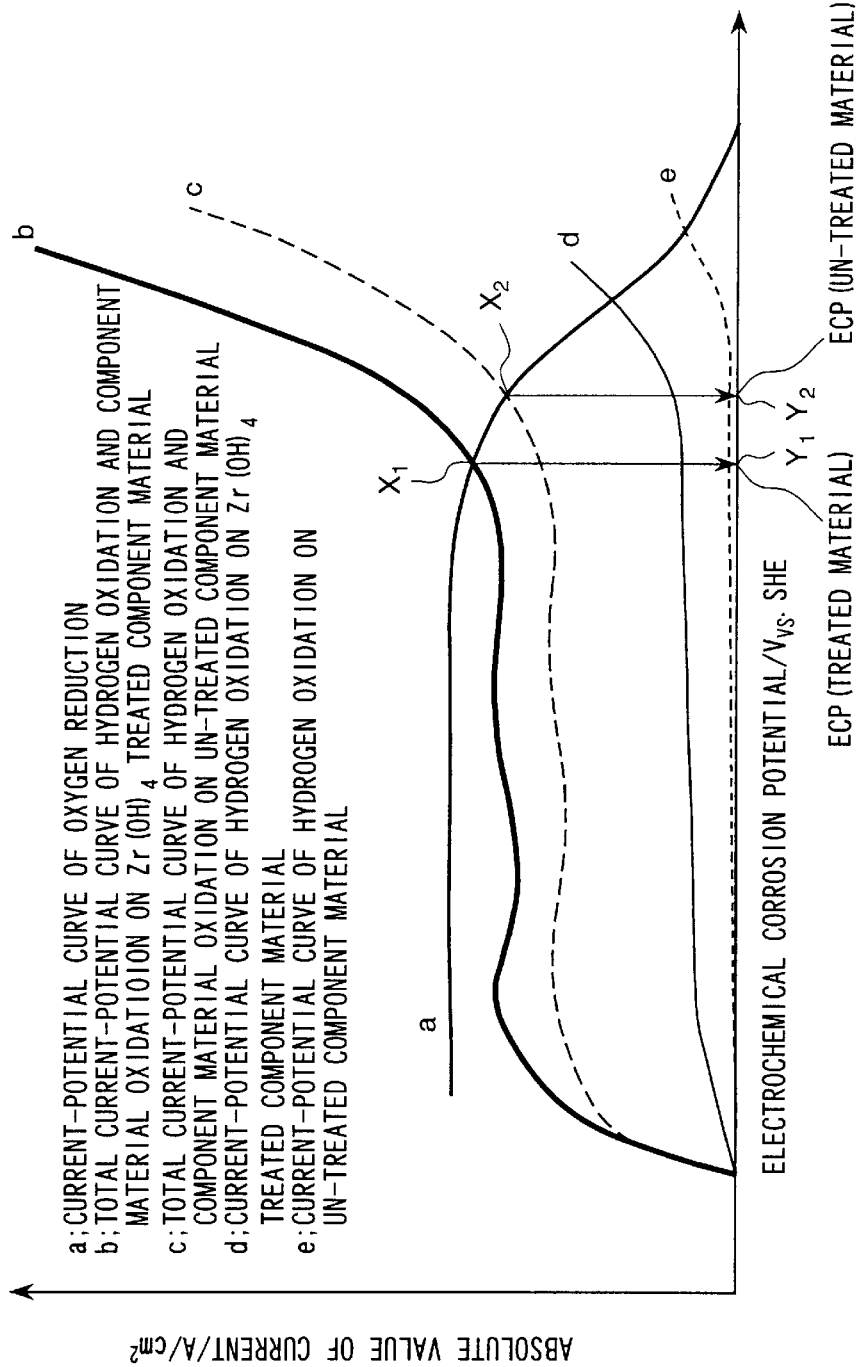

FIG. 3

SCHEMATIC DIAGRAM FOR EXPLAINING MECHANISM OF ECP DECREASE IN $Zr(OH)_4$ TREATED MATERIAL BASED ON MIXED POTENTIAL THEORY a: CURRENT-POTENTIAL CURVE OF OXYGEN REDUCTION
b: TOTAL CURRENT-POTENTIAL CURVE OF HYDROGEN OXIDATION AND COMPONENT MATERIAL OXIDATION ON $Zr(OH)_4$ TREATED COMPONENT MATERIAL
c: TOTAL CURRENT-POTENTIAL CURVE OF HYDROGEN OXIDATION AND COMPONENT MATERIAL OXIDATION ON UN-TREATED COMPONENT MATERIAL
d: CURRENT-POTENTIAL CURVE OF HYDROGEN OXIDATION ON $Zr(OH)_4$ TREATED COMPONENT MATERIAL
e: CURRENT-POTENTIAL CURVE OF HYDROGEN OXIDATION ON UN-TREATED COMPONENT MATERIAL

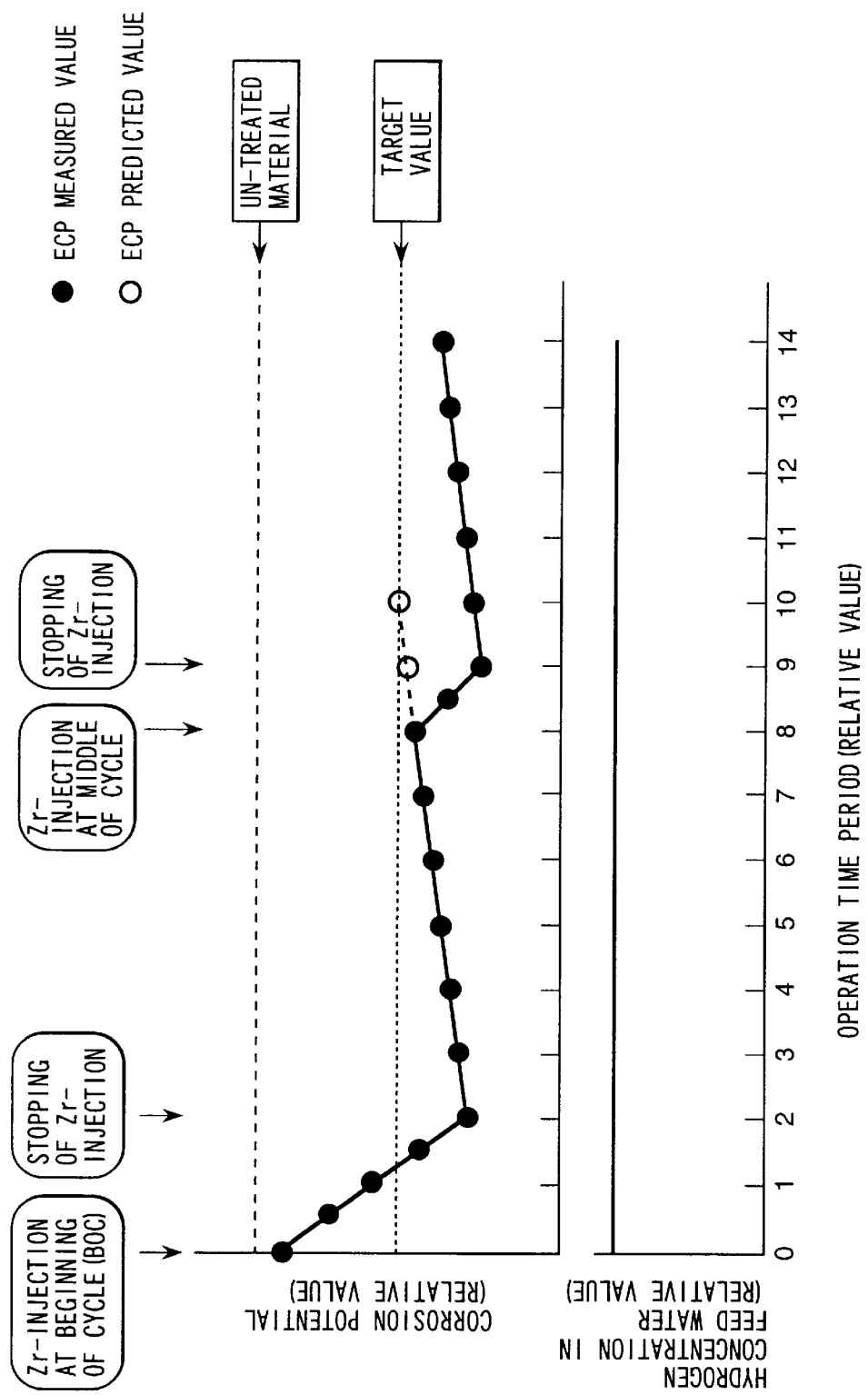

METHOD OF OPERATING NUCLEAR POWER PLANT, NUCLEAR POWER PLANT, AND METHOD OF CONTROLLING WATER CHEMISTRY OF NUCLEAR POWER PLANT

BACKGROUND OF THE INVENTION

1. Field of the Invention

The present invention relates to a method of operating a nuclear power plant and the nuclear power plant and a method of controlling water chemistry of the nuclear power plant in which occurrence of stress corrosion cracking in metallic components in contacting with reactor cooling water of the nuclear power plant is suppressed.

2. Prior Art

Presently, hydrogen injection to reactor water is widely applied to a boiling water reactor as one of measures for preventing occurrence of intergranular stress corrosion cracking (hereinafter, referred to as IGSCC) in a metallic component material of a nuclear reactor component (hereinafter, appropriately referred to as nuclear reactor component material) in contact with the reactor water such as a reactor pressure vessel, a nuclear reactor internal components or piping. There is an electrochemical corrosion potential (hereinafter, referred to as ECP) of a metallic component material as a potential of IGSCC, and it is said that the potential of IGSCC increases as the ECP becomes higher when the ECP exceeds a critical value of ECP (in a case of stainless steels used in the most reactor components, the critical value of ECP is about −230 mV vs.SHE). The hydrogen injection has a function to decease the ECP of metallic component materials.

As a technology of effectively lowering the ECP with injecting a small amount of hydrogen, noble metal injection is disclosed in Japanese Patent Application Laid Open No.7-198893, Japanese Patent Publication No.2818943. In this technology, a solution containing a noble metal typical of platinum, rhodium, palladium is injected into reactor water, and hydrogen is also injected into the reactor water. The injected noble metal is deposited in surfaces of the nuclear reactor components such as the reactor pressure vessel and the reactor internal components, and recombination of oxygen and hydrogen is accelerated by catalysis of the noble metal to form water molecules. As the result, an amount of oxygen is decreased, and the ECP of the nuclear reactor internal components can be decreased lower than the critical value of ECP with a small amount of injected hydrogen.

On the other hand, as technologies of lowering the electrochemical corrosion potential of the nuclear reactor component material without injecting hydrogen, non-noble metal injection is disclosed in Japanese Patent Application Laid-Open No.7-311295, Japanese Patent Application Laid-Open No.8-43587, Japanese Patent Application Laid-Open No.10-197684 and Published Japanese Translation of PCT International Publication for Patent Application No.9-502533. The technologies decrease the ECP of nuclear reactor component materials without injecting hydrogen by doping non-noble metallic spicies typical of zirconium into oxide films on surfaces of the nuclear reactor component materials.

Further, Japanese Patent Application Laid-Open No.8-226994 discloses both of technologies that the electrochemical corrosion potential of the nuclear reactor component materials is decreased with a small of injecting hydrogen by injecting a noble metal and hydrogen into reactor water of a nuclear reactor, and that the electrochemical corrosion potential of the nuclear reactor component materials is decreased by injecting a non-noble metal and hydrogen into reactor water of a nuclear reactor. It is said that the latter technology is applicable even to the case without hydrogen injection.

Presently, hydrogen injection to reactor water is widely applied to a boiling water reactor as one of measures for preventing occurrence of IGSCC. However, a large amount of hydrogen is necessary to be injected in order to decrease the ECP down to a value lower than the critical value of ECP. Increase in the amount of hydrogen injection causes increase in an amount of radioactive nitrogen exhausted to the main steam system, which increases the radiation dose rate of the main steam system.

According to the technologies injecting the solution containing noble metal disclosed in Japanese Patent Application Laid Open No.7-198893, Japanese Patent Application Laid-Open No.8-226994 and so on, the ECP of the nuclear reactor component material can be decreased to a value below the critical value of ECP with a smaller amount of hydrogen injection compared to the case without the noble metal injection. However, in the noble metal injection, it is necessary to perform control in taking an effect on corrosion of the cladding tubes when the injected noble metal is attached onto the surfaces of fuel cladding tubes. In addition to this, there is a problem in that the operating cost is increased due to use of the noble metal.

In the technologies injecting the non-noble metal disclosed in Japanese Patent Application Laid Open No.7-311295, Japanese Patent Application Laid-Open No.8-226994 and so on, zirconium, hafnium, tantalum, niobium, yttrium and so on are shown as the non-noble metals, and acetylacetonato zirconium, zirconium nitrate, zirconyl nitrate are shown as the chemical compounds containing zirconium. By injecting these chemical compounds into reactor water, the ECP can be decreased without hydrogen injection. However, the patents do not disclose any sufficient knowledge on decrease of the ECP, and it cannot said, as far as the contents of Detailed Description of the Invention, that the ECP of the treated material is decreased down to the critical value of ECP capable of suppressing IGSCC. Further, there is a possibility that increase in the conductivity of the cooling water of nuclear reactor due to nitrate group at injection treatment may increase the burden of water chemistry control of the plant.

Further, according to a test conducted by the inventors of the present invention, it is found that a phenomenon completely opposite to decrease of the ECP when zirconium hydroxide is used. That is, when zirconium hydroxide is injected into reactor water of the nuclear reactor without hydrogen injection, the ECP is not decreased but inversely increased, which is different from the phenomenon described in the above-mentioned patents.

SUMMARY OF THE INVENTION

An object of the present invention is to provide a method of operating a nuclear power plant, the nuclear power plant and a method of controlling water chemistry of the nuclear power plant in which in the nuclear power plant, by injecting an amount of hydrogen small enough not to increase a radiation dose rate of the main steam system, ECP of metallic component materials composing a nuclear reactor can be decreased to suppress the potential of occurrence of IGSCC, and the control can be easily performed, and the operating cost can be suppressed to increase.

(1) In order to attain the above object, in the present invention, a method of operating a nuclear power plant for suppressing occurrence of stress corrosion cracking in metallic component materials in contact with reactor cooling water of a nuclear power plant, wherein an electrochemical corrosion potential of the metallic component material is decreased by injecting zirconium hydroxide and hydrogen into the reactor cooling water.

As described above, according to the result of the test conducted by the inventors of the present invention, it is found that on the contrary, the ECP is increased when only zirconium hydroxide is injected into reactor cooling water (hereinafter, referred to as reactor water). However, according to the result of a further test conducted by the inventors of the present invention, it is found that when both of zirconium hydroxide and hydrogen are injected into reactor water, the ECP is substantially decreased compared to in the case of injecting only hydrogen.

Furthermore, as a result of studying these test results, it is estimated that the decrease in the ECP by injecting zirconium hydroxide is different in principle and mechanism from those in the prior art, that is, the decrease in the ECP in the case of injecting only hydrogen or the noble metal and hydrogen into the reactor water, or the decrease in the ECP in the case of injecting only the non-noble metal into the reactor water.

That is, in the case where only hydrogen is injected into the reactor water, it is said that water molecules are formed by recombination of oxygen and hydrogen, and as the result, the oxygen concentration in the reactor water is decreased to decrease the ECP. Further, in the case where the noble metal and hydrogen are injected into the reactor water, it is stated in the published patents described above that recombination of oxygen and hydrogen is accelerated by the catalysis of the noble metal attached on the surfaces of the reactor components, and as the result, the oxygen concentration in the reactor water is decreased to decrease the ECP with the small injection amount of hydrogen.

On the other hand, in the case of the present invention where zirconium hydroxide and hydrogen are injected, it can be estimated that films containing zirconium oxide are formed on the surfaces of the nuclear reactor components, and electrochemical oxidation of hydrogen of anodic reaction is accelerated on the films containing zirconium oxide, which decreases the ECP determined by the balance between cathodic reaction (electrochemical reduction of oxygen dissolved in the reactor water) and the anodic reaction (electrochemical oxidation between the metallic component material and hydrogen) at the boundary between the surfaces of the nuclear reactor components (to be described later).

Further, it is stated that the conventional technology of injecting the non-noble metal into the reactor water can be used under the condition without hydrogen injection. On the contrary, in the present invention, although the ECP is inversely increased when only zirconium oxide is injected into the reactor water, the electrochemical oxidation of hydrogen on the films containing zirconium oxide is accelerated by injecting hydrogen together with the zirconium into the reactor water to substantially decrease the ECP. Therefore, a primary factor of substantially decreasing the ECP exists in the hydrogen on the films of zirconium-oxide treated materials, and accordingly the hydrogen injection is inevitable for decreasing the ECP. Thus, the technology of the present invention is different from the conventional technology of injecting the non-noble metal into the reactor water in principle.

As described above, according to the present invention, by injecting a amount of hydrogen small enough not to increase the radiation dose rate of the main steam system, the ECP of the metallic component materials composing the nuclear reactor can be decreased and accordingly the potential of IGSCC can be made smaller.

Further, zirconium is an element used for the reactor component materials such as cladding tubes of fuel rods, and accordingly corrosion of the cladding tubes are not accelerated even if the zirconium is attached onto the surfaces of the cladding tubes as far as the concentration of zirconium is not excessively high, and the control of zirconium concentration is easy. Furthermore, since zirconium hydroxide is very economical, the operating cost is hardly increased.

(2) Further, in order to attain the above object, in the present invention, a method of operating a nuclear power plant for suppressing occurrence of stress corrosion cracking in metallic component materials in contact with reactor cooling water of a nuclear power plant, wherein electrochemical corrosion potentials of the metallic component materials are decreased by injecting zirconium hydroxide and hydrogen into the reactor cooling water, and an injecting amount of the hydrogen, an injecting amount of the zirconium hydroxide and injecting timing of the zirconium hydroxide are controlled so that the electrochemical corrosion potentials may be maintained below a target value.

As described above, by controlling the injecting amount of the hydrogen, the injecting amount of the zirconium hydroxide and the injecting timing of the zirconium hydroxide while the electrochemical corrosion potential is being monitored, the ECP can be maintained below the target value for a long term.

(3) In the above items (1) and (2), it is preferable that the zirconium hydroxide is injected so that a concentration of zirconium in the reactor cooling water may be kept within a range of 0.5 to 50 ppb.

It is estimated that a processing time required for making the ECP lower than −230 mV vs. SHE is about 1000 hours by setting the concentration of zirconium in the reactor cooling water above 0.5 ppb, and one cycle of nuclear reactor operation period is about 10,000 hours. Therefore, it can be thought that the 1,000-hour period is a practically maximum allowable processing time.

Wearing of sliding rotator members and effects of the zirconium attaching to the fuel cladding tubes can be minimized by setting the concentration of zirconium in the reactor cooling water below 50 ppb.

(4) In the above items (1) and (2), it is particularly preferable that the zirconium hydroxide is injected so that a concentration of zirconium in the reactor cooling water may be kept within a range of 1 to 6 ppb.

The processing time required for making the ECP lower than −230 mV vs. SHE is shorter than 500 hours by setting the concentration of zirconium in the reactor cooling water above 1 ppb, which is a practically sufficient allowable processing time.

In taking it into consideration that the maximum concentration of iron crud injected for reducing the radiation dose rate in the present actual operation is around 5 ppb, by setting the concentration of zirconium in the reactor cooling water to a value below 6 ppb, it may be possible to prevent ill effect of the zirconium oxide in the same kind of the oxide particles on the plant components.

(5) In the above items (1) and (2), it is preferable that the hydrogen is injected so that the concentration of hydrogen in feed water may be kept within a range of 0.1 to 0.6 ppm.

In taking it into consideration that a practical ECP reducing effect of about −100 mV vs. SHE can be obtained by setting the concentration of hydrogen in feed water above 0.1 ppm, the target ECP can be obtained.

By setting the concentration of hydrogen in feed water below 0.6 ppm, the operation of the nuclear power plant can be performed at a hydrogen concentration lower than or equal to that of the hydrogen injection operated at present.

(6) In the above items (1) and (2), it is particularly preferable that the hydrogen is injected so that a concentration of hydrogen in feed water may be kept within a range of 0.3 to 0.5 ppm.

It has been experimentally verified that the ECP can be made lower than −230 mV vs. SHE by setting the hydrogen concentration in feed water to 0.5 ppm when the zirconium concentration is 5 ppb, and that the ECP can be made lower than −230 mV vs. SHE by setting the hydrogen concentration in feed water to 0.3 ppm when the zirconium concentration is the upper limit of 50 ppb. Therefore, by setting the hydrogen concentration in the feed water to a value within the range of 0.3 to 0.5 ppm, the ECP can be made lower than −230 mV vs. SHE within the range of zirconium concentration of 5 ppb to 50 ppb.

(7) Further, in the above items (1) and (2), it is preferable that the metallic component materials are materials selected from the group consisting of stainless steels, nickel based alloys, cobalt based alloys, titanium based alloys, copper based alloys and ferroalloys, non-ferrous alloys, carbon steels and low alloy steels.

It has been clarified from a test result that in the case where the metallic component materials are stainless steels, there is an effect of reducing the ECP.

In the case where the metallic component materials are nickel based alloys, cobalt based alloys, titanium based alloys, copper based alloys and ferroalloys, non-ferrous alloys, carbon steels or low alloy steels, there is also an effect of reducing the ECP by similar action of the film containing zirconium oxide formed on the material surface.

(8) Further, in the above items (1) and (2), it is preferable that the injection of zirconium hydroxide is performed during operating the nuclear power plant at a full power.

(9) In the above items (1) and (2), the injection of zirconium hydroxide may be performed during shut-down operation of the nuclear power plant.

(10) Further, in the above items (1) and (2), it is preferable that the injection of hydrogen is initiated after completion of the injection of zirconium hydroxide.

(11) Further, in the above items (1) and (2), it is preferable that an electrochemical corrosion potential of the metallic component material is monitored when the hydrogen is injected, and zirconium hydroxide is additionally injected during operating the nuclear power plant at full power based on the monitored result.

(12) Further, in order to attain the above object, in the present invention, the nuclear power plant comprises a means for injecting zirconium hydroxide into reactor cooling water; and a means for injecting hydrogen into the reactor cooling water.

(13) Further, in order to attain the above object, in the present invention, the nuclear power plant comprises a means for injecting zirconium hydroxide into reactor cooling water; a means for injecting hydrogen into the reactor cooling water; and a means for monitoring an electrochemical corrosion potential of a metallic component material.

(14) Further, in order to attain the above object, in the present invention, a method of controlling water chemistry of a nuclear power plant is that in order to suppress occurrence of stress corrosion cracking in metallic component materials in contact with reactor cooling water of a nuclear power plant, zirconium hydroxide is injected into the reactor cooling water before injecting hydrogen into the reactor cooling water.

(15) In the above item (14), it is preferable that the zirconium hydroxide is injected so that a concentration of zirconium in the reactor cooling water may be kept within a range of 0.5 to 50 ppb.

BRIEF DESCRIPTION OF DRAWINGS

FIG. 2 is a graph showing results of ECP response for zirconium hydroxide treated materials and an un-treated material obtained from tests which are conducted in order to study the mechanism of reducing the ECP of the zirconium hydroxide treated materials in connection with hydrogen injection.

FIG. 3 is a graph explaining the mechanism of reducing the ECP of the zirconium hydroxide treated materials from the mixed potential theory determining the ECP.

FIG. 10 is a graph explaining another example of a method of operating the BWR plant shown in FIG. 8.

DESCRIPTION OF THE PREFERRED EMBODIMENTS

The inventors of the present invention have studied various kinds of methods of decreasing the ECP of nuclear reactor component materials with an amount of injected hydrogen small enough not to increase a radiation dose rate of the main steam system. As the result, the inventors of the present invention have found that an oxide film containing zirconium is formed on a surface in the reactor water side of the nuclear reactor component material by injecting zirconium hydroxide ($Zr(OH)_4$) into nuclear reactor water, and the film has a property to activate electrochemical oxidation (anodic reaction) of hydrogen. Further, the inventors of the present invention have found a novel knowledge that by using the activating action, the ECP of the nuclear reactor component material can be decreased to a value lower than the value of critical potential of IGSCC with an amount of injected hydrogen small enough not to increase a radiation dose rate of the main steam system.

The results of the study and tests described above will be described below in detail.

Initially, using plate-shaped test pieces made of SUS304 type stainless steel as a treated material and using autoclaves of a circulation type, the following zirconium hydroxide treatments were performed to the plate-shaped test pieces made of SUS304 type stainless steel.

The plate-shaped test pieces made of SUS304 type stainless steel were set in the autoclaves, and pure water controlled having a conductivity smaller than 0.1 µS/cm and a dissolved oxygen concentration of 200 ppb was circulated in the autoclave systems. Next, after heating the autoclaves up to 280° C., film treatment was performed by injecting a zirconium hydroxide solution into positions before the individual autoclaves so that the zirconium concentrations of the treating water became 5 ppb, 20 ppb and 50 ppb, respectively. The treatment time was set to 96 hours.

Next, the following tests in regard to the ECP were conducted using the above zirconium hydroxide treated test pieces and an un-treated test piece made of SUS304 type stainless steel, and ECP response results were obtained.

The zirconium hydroxide treated test pieces and the untreated test piece made of SUS304 type stainless steel were immersed into pure water at 280° C. in the autoclave, and by injecting oxygen and hydrogen from the autoclave water supply system, the water was set to a condition simulating a dissolved oxygen concentration and a dissolved hydrogen concentration of reactor water in a nuclear reactor when hydrogen was injected into the feed water in a actual nuclear power plant, and then the ECPs of the zirconium treated materials and the untreated material were measured.

Figure 1:
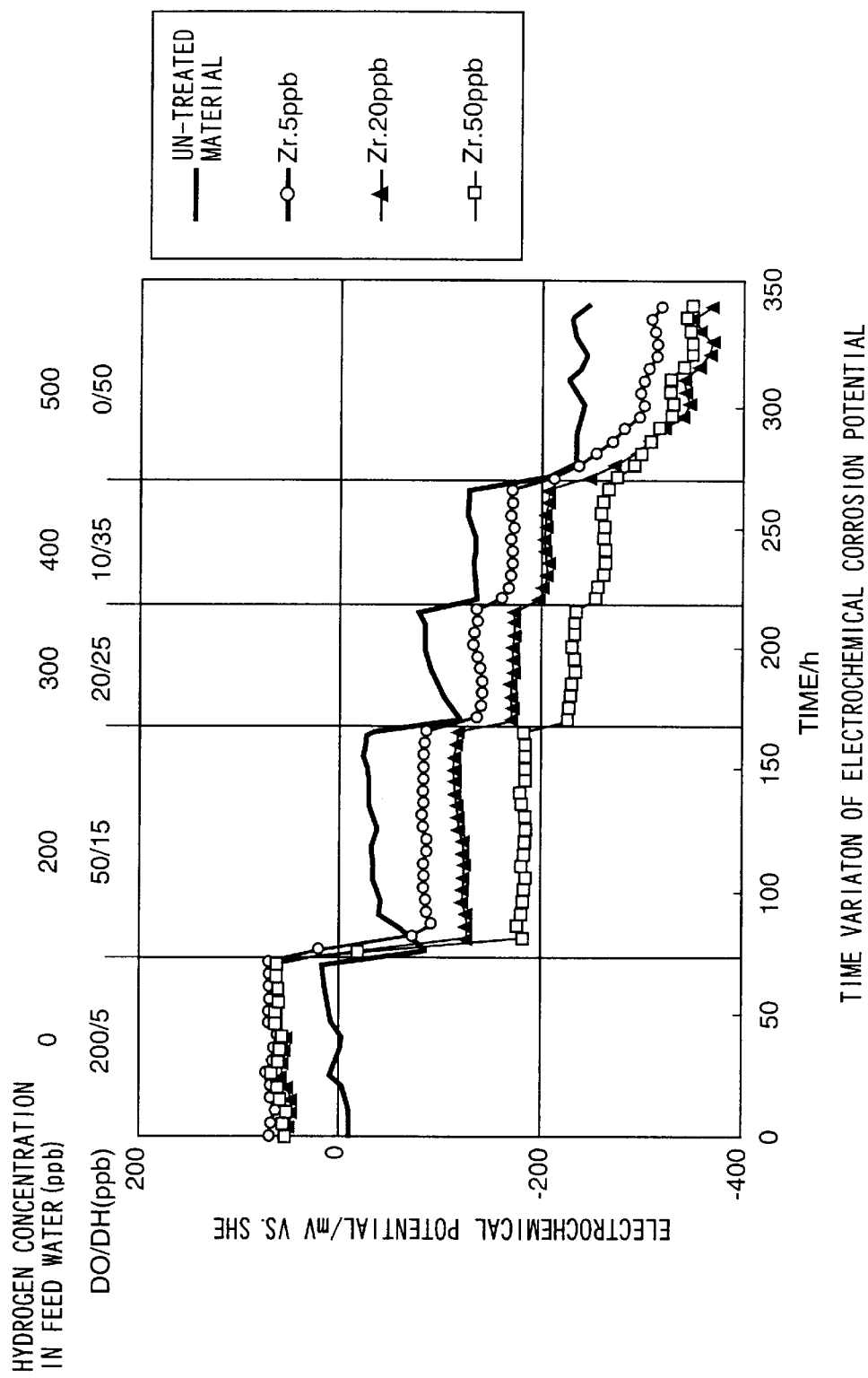
FIG. 1 is a graph showing results of ECP response for zirconium hydroxide treated materials and an un-treated material obtained from tests which are conducted under an autoclave water environment based on a water chemistry in a reactor pressure vessel bottom of an actual plant corresponding to an amount of hydrogen injected from a feed water system of a nuclear power plant.

FIG. 1 shows the results of ECP response for the test pieces of the zirconium hydroxide treated SUS304 type stainless steel and the untreated SUS304 type stainless steel obtained from the tests which have been conducted under the autoclave water environment based on the water chemistry in the reactor pressure vessel bottom of the actual plant corresponding to an amount of hydrogen injected to the feed water system of the nuclear power plant. The condition of water chemistry in the reactor pressure vessel bottom (the dissolved oxygen, the dissolved hydrogen) was set based on a result of water chemistry calculation taking radiation decomposition of water in a nuclear power plant modeling BWR-3 into consideration. Hydrogen peroxide was contained in the reactor water of the actual plant, but in the test, oxygen is used as the test parameter as the oxidizing agent.

In FIG. 1, the test condition of dissolved oxygen concentration DO/ dissolved hydrogen concentration DH (ppb)= 200/5 shows a condition of oxygen and hydrogen concentrations which is close to normal water chemistry in the reactor pressure vessel bottom when hydrogen is not injected into the feed water. Similarly, the test condition of DO/DH (ppb)=50/15 corresponds to a condition of oxygen and hydrogen concentrations which simulates water chemistry in the reactor pressure vessel bottom when the hydrogen concentration in the feed water becomes 200 ppb by injecting hydrogen to the feed water system; the test condition of DO/DH (ppb)=20/25 corresponds to a condition of oxygen and hydrogen concentrations which simulates water chemistry in the reactor pressure vessel bottom when the hydrogen concentration in the feed water becomes 300 ppb by injecting hydrogen to the feed water system; the test condition of DO/DH (ppb)=10/35 corresponds to a condition of oxygen and hydrogen concentrations which simulates water chemistry in the reactor pressure vessel bottom when the hydrogen concentration in the feed water becomes 400 ppb by injecting hydrogen to the feed water system; and the test condition of DO/DH (ppb)=0/50 corresponds to a condition of oxygen and hydrogen concentrations which simulates water chemistry in the reactor pressure vessel bottom when the hydrogen concentration in the feed water becomes 500 ppb by injecting hydrogen to the feed water system.

Further, in FIG. 1, the solid line indicates the ECP response for the untreated material of SUS304 type stainless steel. The hollow circle ○, the solid triangle ▲ and the hollow square □ indicate the ECP responses for the treated test pieces of SUS304 type stainless steel treated with zirconium concentrations in the treating water of 5 ppb, 20 ppb and 50 ppb using zirconium hydroxide as described above, respectively.

As shown in FIG. 1, in the normal reactor water condition, the ECPs of the zirconium hydroxide treated stainless steel test pieces are rather higher than the ECP of the un-treated material. This is a phenomenon which is firstly discovered by the inventors of the present invention.

It is observed that when hydrogen is injected into the autoclave so as to correspond to the feed water hydrogen concentration of 200 ppb level, the ECPs of the treated materials begin to be substantially decreased compared to that of the un-treated material, and that the decreasing degree of the ECP is larger as the zirconium concentration at the treatment is higher. It is also observed that in the conditions of the reactor pressure vessel bottom water chemistry corresponding to the feed water hydrogen concentrations of 300 ppb and 400 ppb, the decrease in the ECP becomes larger as the concentration of injection hydrogen is increased.

At present, actual BWR plants are generally operated by controlling injection of hydrogen into the feed water to maintain the hydrogen concentration around 500 ppb level in order to suppress increase of the radiation dose rate in the turbine building to a certain degree. However, when the ECP can be decreased lower than the critical value of IGSCC of −230 mV vs. SHE, as shown by the present test results, the sufficient effect of decreasing ECP can be attained without increasing the radiation dose rate in the turbine building.

FIG. 2 shows results of studying the relation between the hydrogen injection and the mechanism of decreasing the ECP of zirconium hydroxide treated stainless steel test pieces.

In FIG. 2, the test condition of DO/DH (ppb)=200/5 corresponds to the simulated condition which is close to normal water chemistry in the reactor pressure vessel bottom without hydrogen injection into the feed water, as described above. The test condition of DO/DH (ppb)=50/0 shows the case that an environment of water chemistry (DO/DH (ppb)=50/15) in the reactor pressure vessel bottom corresponds to a hydrogen concentration in the feed water of 200 ppb level, and then the hydrogen is removed and the oxygen concentration is brought to 50 ppb. The test condition of DO/DH (ppb)=50/15 shows the case that the autoclave water chemistry under the above condition is returned to the condition of water chemistry of DO/DH (ppb)=50/15, shown in FIG. 1, by injecting hydrogen again so that the hydrogen concentration becomes 15 ppb.

In the normal reactor water condition, the ECPs of the zirconium hydroxide treated stainless steel test pieces are higher than the ECP of the un-treated material. When hydrogen is removed from the environment of water chemistry in the reactor pressure vessel bottom corresponds to the feed water hydrogen concentration of 200 ppb level, the ECPs of both of the zirconium hydroxide treated stainless steel test pieces and the un-treated material are decreased. However, the ECPs of the former is still higher than the ECP of the latter. On the other hand, it is found that when the autoclave water chemistry is returned to the condition of water chemistry of DO/DH (ppb)=50/15 by injecting hydrogen again in the autoclave under the above condition, the ECPs of the zirconium hydroxide treated materials are decreased lower than the ECP of the untreated material with good reproducibility.

Therefore, it is clarified that the factor of substantially decreasing the ECPs of the zirconium hydroxide treated materials compared to that of the un-treated material is the hydrogen on the films of zirconium-hydroxide treated materials, and that the hydrogen injection is inevitable for decreasing the ECPs of the zirconium hydroxide treated materials.

FIG. 3 is a graph explaining the mechanism of reducing the ECPs of the zirconium hydroxide treated stainless steel test pieces from the mixed potential theory based on the results of the tests and the study described above.

The mixed potential theory shows that in a reaction system accompanied by electron donation and acceptance, the reaction comes in a dynamic equilibrium condition at an electrochemical potential where the electron donation and acceptance rates are equal to each other. In a case where there is a metallic material in the reaction system, the ECP is the electrochemical potential in the dynamic equilibrium condition described above.

In a case where a metallic component material is in contact with hydrogen and oxygen through water, a chemical species which seizes electrons is an oxidizing agent of oxygen. On the other hand, chemical species which electrons are removed from (which donate electrons) are hydrogen and the metallic component material. Therein, the reactions among oxygen, hydrogen and the metal can be expressed by the following electrochemical reduction (cathodic reaction) and oxidation (anodic reaction).

Reduction of oxygen (cathodic reaction):

$$O_2 + 4e^- \rightarrow 2O^{2-} \quad (1)$$

Oxidation of hydrogen and metal (anodic reaction)

$$H_2 \rightarrow 2H^+ + 2e^- \quad (2)$$

$$M \rightarrow M^{n+} + ne^- \quad (3)$$

(M is a metal atom, and n is an integer)
The point where the amount of consumed electrons in the equation (1) and the amount of generated electrons in the equations (2) and (3) are balanced is the ECP.

Referring to FIG. 3, the curve a indicates a current-potential curve of the reduction of oxygen. The curve b indicates a total current-potential curve of the oxidation of hydrogen and the oxidation of the metallic component material on the zirconium hydroxide treated component material. The curve c indicates a total current-potential curve of the oxidation of hydrogen and the oxidation of the metallic component material on the untreated component material. The curve d indicates a current-potential curve of the oxidation of hydrogen on the zirconium hydroxide treated component material. The curve e indicates a current-potential curve of the oxidation of hydrogen on the un-treated component material.

As described in FIG. 2, it is clarified that the factor of substantially decreasing the ECPs of the zirconium hydroxide treated materials compared to that of the un-treated material is the hydrogen on the films of zirconium-hydroxide treated materials. It can be estimated from the result that the current value of the oxidation of hydrogen on the untreated material (the amount of electron generation in the equation (2) described above: reaction rate) is smaller than the current value of the oxidation of hydrogen on the zirconium hydroxide treated component material, as shown by the curves e and d. In other words, it is clarified that the film of the zirconium hydroxide treated material formed on the metallic material has a kind of catalysis to activate the oxidation of hydrogen.

Therefore, from the curves b and c, the total of the oxidation of hydrogen and the oxidation of the component material, which is the total of the electron donation reactions in the individual conditions, becomes larger by the increased amount of the reaction rate due to activation of the oxidation of hydrogen on the treated material. From the mixed potential theory, the ECPs are the electrochemical potential Y1 at the intersection X1 of the curve a and the curve b (the zirconium hydroxide treated material) and the electrochemical potential Y2 at the intersection X2 of the curve a and the curve c (the untreated material), respectively.

That is, in the case of the metallic component material without zirconium hydroxide treatment, the electron donation and acceptance between the cathodic reaction of oxygen and the anodic reactions of hydrogen and the metal are balanced to each other at the intersection X2 of the curve a and the curve c, and as the result the ECP of the metallic component material becomes the value of Y2. On the other hand, in the case where the oxide film of zirconium hydroxide is formed on the metallic component material through the zirconium hydroxide treatment, the oxidation of hydrogen is activated to shift the electron donation reaction of the total of the oxidation of hydrogen and the oxidation of the component material upward as shown by the curve b, and accordingly to shift the intersection X1 with the curve a toward the lower potential side than the intersection X2 for the untreated material. That is, the ECP is lowered to the value of Y1.

As described above, the phenomenon of decrease of ECP caused by the activation of hydrogen reaction can be easily understood from the mixed potential theory.

The mechanism decreasing the ECP of the present invention is essentially different from the mechanism of the technology of injecting the non-noble metal described in Japanese Patent Application Laid-Open No.7-311295, Japanese Patent Application Laid-Open No.10-197684 and Japanese Patent Application Laid-Open No.8-226994. The mechanism of decreasing the ECP in these conventional technologies is explained that the electrochemical resistance of the film is increased to suppress reduction of oxygen on the film surface, and the ECP is determined by information of interface between the base metal and the oxide film. On the other hand, in the present invention, although the ECP is inversely increased when only the oxide film of zirconium hydroxide is formed on the component material by the zirconium hydroxide treatment, the zirconium hydroxide treated film surface of component material activates the reduction of hydrogen of electrochemical reaction to decrease the ECP when hydrogen is also injected as the inevitable treatment of the present invention.

Further, mechanism decreasing the ECP of the present invention is essentially different from the mechanism of the technology of injecting the noble metal described in Japanese Patent Application Laid-Open No.7-1988893 and so on. The principle of these conventional technologies is that recombination of $H_2$ and $O_2$ is accelerated by catalysis of the noble metal attached onto the surface of the nuclear reactor components to decrease the oxygen concentration and consequently to decrease the ECP. This is equivalent to that the current-potential curve a of the reduction of oxygen in FIG. 3 is shifted downward by decrease of the oxygen concentration, and accordingly the intersection of the curve a and the curve c is shifted toward the lower potential side than the intersection X2. In the present invention, as described above, the oxidation of hydrogen is activated by the oxide film of zirconium hydroxide to shift the electron donation reaction of the total of the oxidation of hydrogen and the oxidation of the component material upward as shown by the curve b, and accordingly to shift the intersection X1 with the curve a toward the lower potential side than the intersection X2 for the untreated material. That is, the ECP is lowered to the value of Y1.

Accordingly, in the present invention based on the principle described above, zirconium hydroxide is initially injected into the reactor water of the nuclear reactor to form the oxide film containing zirconium on the reactor water side surfaces of the nuclear power plant components in contact with the reactor water of the nuclear reactor. Then, by injecting hydrogen into the reactor water of the nuclear reactor, the oxidation of hydrogen as the anodic reaction is accelerated on the reactor water side surfaces of the nuclear reactor components having the oxide film containing zirconium, and as the result the ECP determined by the balance between the cathodic reaction and the anodic reaction is decreased to prevent occurrence of IGSCC in the nuclear reactor components.

The injection amounts of zirconium hydroxide and hydrogen in the present invention will be quantitatively described below.

Firstly, in regard to the upper limit of the injection amount of zirconium hydroxide, it can be understood from the test result shown in FIG. 1 that the effect of reducing the ECP becomes larger as the injection amount of zirconium hydroxide is more and as the concentration of zirconium in the cooling water of nuclear reactor is higher. However, considering the injection in an actual nuclear power plant, it is considered that there may be ill affects of wearing of rotator sliding members and of attaching of zirconium to the fuel claddings when the zirconium concentration in the reactor water is excessively high. From the point of view, in the present invention, it is preferable that the zirconium concentration in the reactor water is lower than 50 ppb.

In the boiling water reactor plants in Japan at present, the maximum concentration in the reactor water of iron crud injected for reducing the radiation dose rate is around 5 ppb, and at this level of iron crud concentration, any ill effect to the plant components is not observed. In the case of injecting zirconium hydroxide, although zirconium hydroxide finally becomes zirconium oxide, zirconium hydroxide is the oxide particles similarly to iron crud. Therefore, in the case of injecting zirconium hydroxide, when the concentration of zirconium in the reactor water is set to around 5 ppb, it may be possible to prevent ill effect to the plant components even if it is continuously injected. Thus, the concentration of zirconium in the reactor cooling water is preferably set to a value below 6 ppb, and particularly preferable to set a value around 5 ppb.

It has been clarified from a result of the test conducted by the inventors of the present invention that the ECP can be made below −230 mV vs. SHE of the threshold of IGSCC by treating the component materials in a zirconium concentration of 5 ppb for 100 hours, and that the ECP can be made below −230 mV vs. SHE of the threshold of IGSCC by treating the component materials in a zirconium concentration of 6 ppb for 83 hours. The treatment time of 100 hours is practically no problem compared to one cycle of the reactor operating period (about 10,000 hours). From the point of view, it is also preferable that the concentration of zirconium in the reactor cooling water is set to a value below 6 ppb, and particularly preferable to set a value around 5 ppb.

In regard to the lower limit of the injection amount of zirconium hydroxide, it can be understood from the test result that the effect of reducing the ECP becomes larger as the concentration of zirconium is increased higher. The reason can be explained that the amount of zirconium attached to the material surface is increased by increasing the zirconium concentration. It can be considered that the amount of zirconium attached to the material surface is in proportion to the total amount of zirconium hydroxide, that is, the product of the amount of injected zirconium and the injecting time. Therefore, when the zirconium concentration is set to 0.5 ppb, the treatment time required to make the ECP below −230 mV vs. SHE is 100 hours×5 ppb/0.5 ppb=1,000 hours. When the zirconium concentration is set to 1 ppb, the treatment time required to make the ECP below −230 mV vs. SHE is 100 hours×5 ppb/1 ppb=500 hours. One cycle of the reactor operating period is about 10,000 hours, as described above. Even if 1,000 hours is used for the zirconium hydroxide treatment, the effect of the zirconium hydroxide treatment in accordance with the present invention can be received for the remaining 9,000 hours. Therefore, it can be considered that the 1,000 hour treatment time is the maximum allowable treatment time. In order to lengthen the period of receiving the effect of the present invention, it is preferable that the treatment time is limited to about 500 hours.

From the above, it is preferable that the zirconium concentration in the reactor water is set to a value above 0.5 ppb, and particularly preferable to set the zirconium concentration to a value above 1 ppb.

Figure 4:
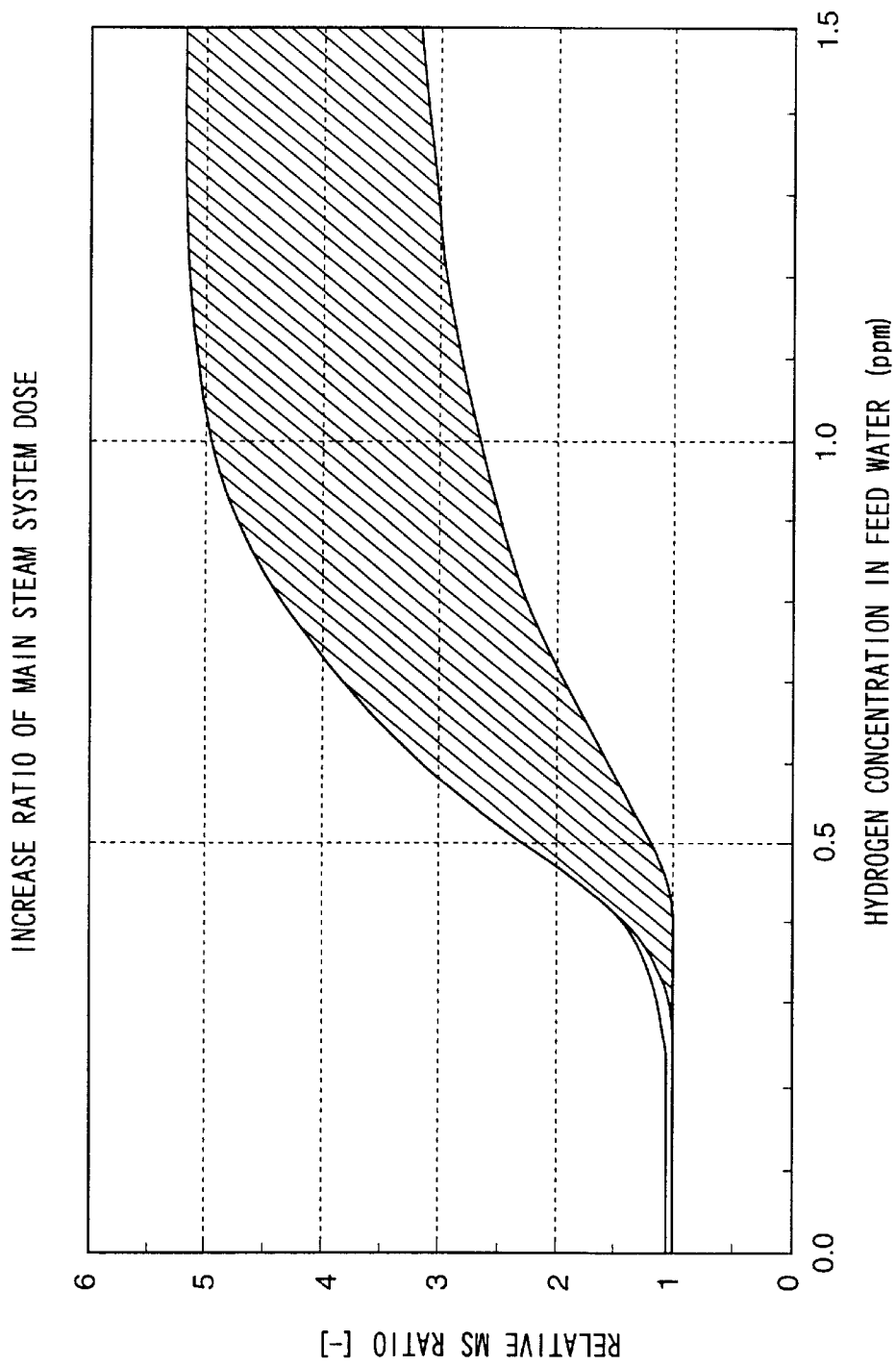
FIG. 4 is a graph showing the relationship between hydrogen concentration in feed water and radiation dose rate of a main steam system.

On the other hand, in regard to the upper limit of the injection amount of hydrogen, it can be understood that the effect of reducing the ECP becomes larger as the concentration of hydrogen becomes higher. However, when the hydrogen concentration is increased, the radiation dose rate of the main steam system is increased. FIG. 4 shows this phenomenon, and the radiation dose rate shown by relative MS ratio begins to be increased from a point of hydrogen concentration of about 0.4 ppm and falls within the range shown by a diagonally shaded area in the figure. Therefore, in the nuclear power plants in Japan, the amount of hydrogen injection is generally limited to a value below 0.6 ppm. From the point of view, it is preferable that the hydrogen is injected so as to make the concentration of hydrogen in feed water below 0.6 ppm.

Further, it is preferable that the zirconium concentration in the reactor water is set to a value around 0.5 ppb, as described above. It can be understood from the test results of FIG. 1 that the ECP can be made lower than −230 mV vs. SHE by setting the hydrogen concentration in feed water to 0.5 ppm when the zirconium concentration is 5 ppb. It can be understood from the test results of FIG. 1 that the ECP can be made lower than −230 mV vs. SHE by setting the hydrogen concentration in feed water to 0.3 ppm when the zirconium concentration is 50 ppb. Therefore, it is particularly preferable that the concentration of hydrogen in feed water is within a range of 0.3 to 0.5 ppm.

On the other hand, in regard to the lower limit of the injection amount of hydrogen, the practical decreasing effect of the ECP can be obtained from −100 mV vs. SHE, and the concentration of hydrogen in feed water in that case is about 0.1 ppm. Therefore, it is preferable that the concentration of hydrogen in feed water is above 0.1 ppm.

An embodiment in accordance with the present invention will be described below, referring to the accompanied drawings.

Figure 5:
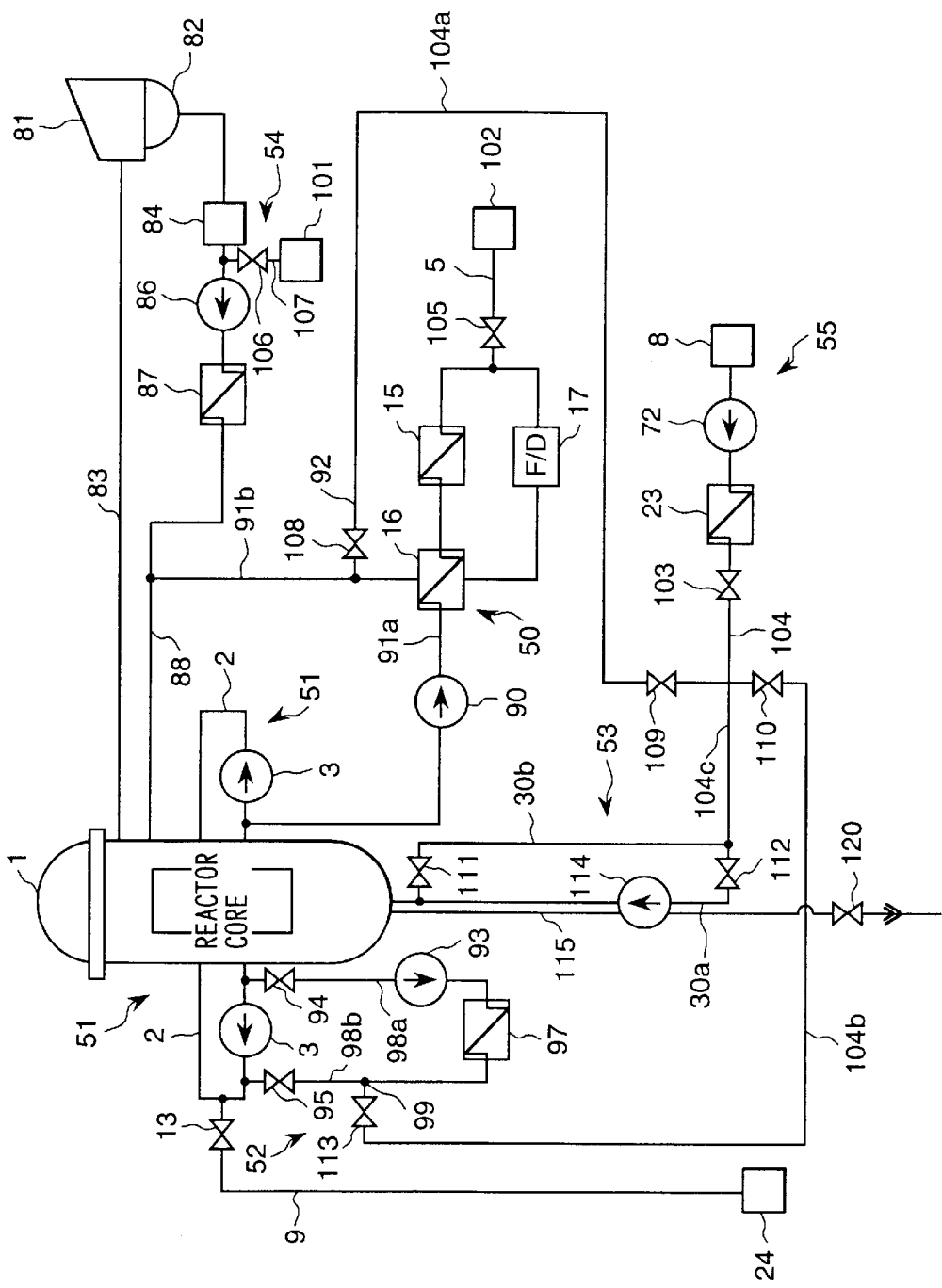
FIG. 5 is a diagram showing the system structure of a first embodiment of a BWR plant in accordance with the present invention.

FIG. 5 is a diagram showing the system structure of a first embodiment of a boiling water type nuclear reactor power plant (hereinafter, referred to as BWR plant) in accordance with the present invention, and in this figure parts different from the conventional nuclear power plant are illustrated by bold lines.

Referring to FIG. 5, the BWR plant comprises a reactor pressure vessel (hereinafter, referred to as RPV) 1, and steam generated in the RPV 1 is supplied to a turbine 81 through a main steam pipe 83, and then condensed to water by a condenser 82. The condensed water becomes feed water which is pumped by a feed water pump 86 and returned to the RPV 1 through a feed water pipe 88. The feed water is purified by a condensate purifier 84 and heated up by a feed water heater 87 while flowing through the feed water pipe 88.

The BWR plant further comprises a reactor water cleanup system 50, a primary loop recirculation system 51, a residual heat removal system 52, a control rod drive water system 53, a hydrogen injection system 54 and a zirconium hydroxide injection system 55.

The reactor water cleanup system 50 is composed of a regenerative heat exchanger 16, a non-regenerative heat exchanger 15, a demineralizer 17, a pump 90 and reactor water cleanup system pipes 91a, 91b, and the reactor water in the RPV 1 is pumped by the pump 90 to flow through the reactor water cleanup system pipe 91a, the regenerative heat exchanger 16, the non-generative heat exchanger 15 and cleaned up by the demineralizer 17, and then returned to the RPV 1 through the regenerative heat exchanger 16, the reactor water cleanup system pipe 91b and the feed water pipe 88.

A reactor water cleanup system sampling tube 5 is arranged at a position of the pipe between the non-regenerative heat exchanger 15 and the demineralizer 17. The water chemistry of the reactor water is measured by opening a valve 105 to conduct the reactor water to a water chemistry monitoring measurement instrument 102 through the reactor water cleanup system sampling tube 5.

The primary loop recirculation system 51 is composed of a recirculation pump 3 and a recirculation piping 2, and the reactor water in the RPV 1 is pumped by the recirculation pump 3 to be returned to the RPV through the recirculation piping 2. Thereby, the reactor water is circulated in the nuclear reactor.

A primary loop recirculation system sampling pipe 9 is arranged at a position of the primary loop recirculation system piping 2. The water chemistry of the reactor water is measured by opening a valve 13 to conduct the reactor water to a water chemistry monitoring measurement instrument 24 through the primary loop recirculation system sampling pipe 9.

The residual heat removal system 52 is a system removing decay heat generated from the reactor core, and is composed of an inlet valve 94, a pump 93, a heat exchanger (a cooler) 97, residual heat removal system pipes 98a 98b and an outlet valve 95. In order to cool the reactor water during shut-down reactor operation, the inlet valve 94 and the outlet valve 95 are opened, and the pump 93 is operated. By operating the pump 93, the reactor water in the nuclear reactor is transferred to the heat exchanger 97 through the residual heat removal system pipe 98a, and after being cooled, returned to the RPV 1 through the residual heat removal system pipe 98b and the recirculation piping 2.

The control rod drive water system 53 comprises a pump 114 and control rod drive water pipes 30a and 30b, and supplying and draining of drive water is controlled by opening and closing valves 111, 112 to drive the control rod.

The hydrogen injection system 54 is composed of a valve 106, a hydrogen injection pipe 107 and a hydrogen supply unit 101, and hydrogen gas is injected into the feed water pipe 88 in the inlet side of the feed water pump 86.

Further, a drain pipe 115 having a valve 120 for draining liquid in the RPV 1 is arranged in the bottom of the RPV 1.

The zirconium hydroxide injection system 55 is composed of a zirconium injection pipe 104, a valve 103, a heater 23, a pump 72 and a zirconium injection tank 8. The zirconium injection pipe 104 is connected to a drain line 92 provided in the reactor water cleanup system pipe 91 of the reactor water cleanup system 50, a drain line 99 provided in the residual heat removal system pipe 98b of the residual heat removal system 52 and the control rod drive water pipe 30b of the control rod drive water system 53 through pipes 104a, 104b, 104c so that the zirconium hydroxide may be injected from the zirconium hydroxide injection system 55 into three systems of the reactor water cleanup system 50, the residual heat removal system 52 and the control rod drive water system 53.

A method of operating the above-described BWR will be described below.

Initially, a first example of plant operation will be described, referring to FIG. 5. The example of plant operation is that the zirconium hydroxide is injected to the reactor water cleanup system 50 during full power operation of the nuclear reactor.

A preset amount of zirconium hydroxide solution in a preset concentration condition is prepared in the zirconium injection tank 8. When the output electric power reaches approximately 100% power and various kinds of operation parameters such as reactor water temperature, recirculation water flow rate, core flow rate, reactor water cleanup system flow rate and so on reach their rated values after starting operation of the nuclear reactor, the valves 103, 108 and 109 are opened to inject the zirconium hydroxide solution into the reactor water cleanup system pipe 91b through the pipe 104a after checking the stable operation. At that time, the valves 110, 113, 111 and 112 in the lines connected from the zirconium hydroxide injection system 55 to the other systems of the nuclear reactor are kept closed.

The zirconium hydroxide solution is adjusted to a preset concentration, and then a preset amount of the zirconium hydroxide solution is stored in the injection tank 8. The zirconium hydroxide solution is injected into the reactor water cleanup system pipe 91b by starting operation of the injection pump 72. Further, before being injected into the reactor water cleanup system pipe 91b, the zirconium hydroxide solution is pre-heated up to a preset temperature by the heater, if necessary.

It is preferable to the zirconium hydroxide solution from flowing into the water chemistry sampling line during injecting the zirconium hydroxide solution. Therefore, it is particularly preferable that the valve 13 and the valve 105 are closed to isolate the recirculation system sampling line 9 and the reactor water cleanup system sampling line 5 which are for monitoring the dissolved oxygen concentration and the electric conductivity of the reactor water. Of course, the valve 13 and the valve 105 may be opened if the water chemistry needs to be monitored.

Further, it is necessary to monitor the zirconium concentration in the reactor water during injecting the zirconium hydroxide solution. Therefore, the valve 105 of the reactor water cleanup system sampling line 5 is sometimes opened to measure the zirconium concentration of the reactor water using the water chemistry monitoring meter 102.

The method of injecting the zirconium hydroxide solution is that a large amount of the zirconium hydroxide solution is initially injected so that the zirconium concentration is increased to a preset level, for example, to a level of about 5 ppb, in a short time, and the injecting amount of the zirconium hydroxide solution is decreased when the zirconium concentration is approaching a value near 5 ppb, and then a small amount of the zirconium hydroxide solution is continuously being injected to maintain that zirconium concentration when the zirconium concentration becomes a value around 5 ppb. This condition is maintained for a preset time period, for example, 100 hours.

Part of the zirconium hydroxide injected to the reactor water with the preset concentration for the preset time period is attached to the surfaces of stainless steel and nickel based alloy of the nuclear reactor component materials, and gradually oxidized to be turned into zirconium oxide ($ZrO_2$) which is a thermodynamically stable chemical form in the reactor environment.

Since there are many oxidation reaction processes from zirconium hydroxide ($Zr(OH)_4$) to zirconium oxide ($ZrO_2$), part of the zirconium hydroxide is oxidized in the reactor water to be turned to zirconium oxide ($ZrO_2$) and then to attach onto the surface of the nuclear reactor component materials.

After completion of the zirconium hydroxide injection process, the valve 103 is closed.

Next, the valve 106 is opened to perform hydrogen injection.

The hydrogen injection is performed by injecting hydrogen gas from the hydrogen injection system 54 composed of the valve 106, the hydrogen injection line 107 and the hydrogen supply unit 101 into the feed water pipe 88.

The oxidation rate from zirconium hydroxide to zirconium oxide depends on the dissolved oxygen concentration of the reactor water, and the oxidation rate becomes faster as the dissolved oxygen concentration is higher. Therefore, in this embodiment, it is determined that the zirconium hydroxide is turned to zirconium oxide by oxidation treatment using oxygen of about 200 ppb dissolved in the reactor water for a preset time period after injecting the zirconium hydroxide, and then the hydrogen injection process is performed.

During injecting hydrogen, the hydrogen concentration in the feed water is estimated from an injecting amount of hydrogen gas, and the concentration is controlled so as to become a preset level, for example, about 0.5 ppm. The hydrogen concentration in the feed water is diluted to 0.1 time at the inlet of reactor core.

It is known from the test results of FIG. 1 described above that under the simulated BWR water chemistry condition of the hydrogen concentration of 0.5 ppm in the feed water, the electrochemical corrosion potential of the non-treated material is about −180 mV vs. SHE, but the electrochemical corrosion potential of the material treated with the zirconium concentration of 5 ppb is substantially decreased down to a value below −230 mV vs. SHE.

On the other hand, in the BWR plant in which hydrogen injection is performed, the radiation dose rate of the main steam system is increased when the hydrogen concentration exceeds about 0.4 ppm, as shown in FIG. 4. In order to prevent increase of the radiation dose rate of the main steam system, it is preferable that the hydrogen concentration is set to a value about 0.3 ppm. In this case, it is known that the electrochemical corrosion potential can be substantially decreased down to a value below −230 mV vs. SHE by setting the zirconium concentration to 50 ppb under the simulated BWR water chemistry condition of the hydrogen concentration 0.3 ppm in the feed water.

Therefore, by performing the processes of starting operation of the nuclear reactor, full power operation of the nuclear reactor, injection of zirconium hydroxide, oxidation treatment of zirconium hydroxide to zirconium oxide and injection of hydrogen, as described above, the electrochemical corrosion potential of the nuclear reactor component materials can be sufficiently decreased below −230 mV vs. SHE, which is regarded as the threshold of the IGSCC, with injecting a small amount of hydrogen to the feed water and accordingly without increasing the radiation dose rate of the main stream system. Further, since zirconium hydroxide has a small degree of dissociation in water and is stably suspended in water in the form of molecular state up to the concentration of 50 to 100 ppm, pH of the water is almost neutral and accordingly the effect of the zirconium hydroxide injection on pH of the reactor water is small.

In addition, since zirconium hydroxide contains neither of nitrate radical nor sulfate radical, there is no possibility that zirconium hydroxide is dissociated to form nitrate ions or sulfate ions in the reactor water and to increase the electric conductivity of the reactor water.

Further, since there is no possibility that zirconium hydroxide is dissociated to form nitrate ions, there is no possibility that nitrate ions are turned to volatile ammonia under the hydrogen injection condition to increase an amount of transported radioactive nitrogen to the main steam system. Furthermore, since zirconium is the base component of the fuel cladding tube on the surface of which a zirconium oxide film is formed, corrosion of the fuel rod cannot be accelerated as far as the zirconium concentration in the reactor water does not become excessively high.

In addition to the above, since zirconium hydroxide can be purchased with very low price, the operation cost is not increased so much.

In the operating method described above, hydrogen is injected after injecting zirconium hydroxide. However, a very small amount of hydrogen peroxide exists in the reactor water even when hydrogen is injected, and zirconium hydroxide is gradually changed to stable zirconium oxide by the oxidizing agent. Therefore, even if zirconium hydroxide is injected at a time in the hydrogen injecting process by extending the injection operating time, the same effect as described above can be obtained.

A second example of operating a BWR plant will be described below, referring to FIG. 5. The operation example is that the zirconium hydroxide solution is injected into the pipe 98b of the residual heat removal system 52 during shut-down operation of the nuclear reactor.

During normal shut-down operation, by opening the inlet valve 94 and the outlet valve 95 of the residual heat removal system 52 and driving the pump 93, the reactor water in the RPV 1 is transferred to the heat exchanger 97 through the pipe 98a, and after cooling the reactor water is returned to the RPV 1 though the pipe 98b and the recirculation system pipe 2. By doing so, temperature of the nuclear reactor water is cooled down to near 50° C. with a cooling speed of 30° C./hr in about 20 hours. In this embodiment, by controlling the reactor water to an appropriate temperature using the cooler 97 and the heater 23 during shut-down operation, zirconium hydroxide is injected from the zirconium injection system 55 into the pipe 98*b* of the residual heat removal system 52. However, the appropriate temperature in this case is a temperature in a range lower than the reactor water temperature at full power operation and lower than the reactor water temperature of about 150° C. at which the residual heat removal system 52 is operable.

During injecting zirconium hydroxide into the residual heat removal system 52, the valves 103, 110 and 113 are opened and the valves 109, 108, 111 and 112 are kept closed.

Since the reactor water temperature is lower than that during full power operation, oxidation rate from zirconium hydroxide to zirconium oxide is slower than that in the operating method of the first embodiment. However, there is an advantage in that the zirconium hydroxide injection time period in the next operation cycle performed by the injection method described in the first embodiment can be shortened because zirconium hydroxide is injected during shut-down cooling.

In this embodiment, the zirconium hydroxide solution is injected into the plant from the residual heat removal system 52 during shut-down operation. However, the zirconium hydroxide solution may be directly injected into the plant from the zirconium injection system 55 at starting operation of the nuclear reactor by closing the inlet valve 94 of the residual heat removal system 52 and opening only the outlet valve 95.

A third example of operating a BWR plant will be described below, referring to FIG. 5. The operation example is that the zirconium hydroxide solution is injected into the pipe 30*b* of the control rod drive water system 53.

In the state that the valves 103 and 111 are opened and the valves 108, 109, 110, 113 and 112 are closed, the zirconium hydroxide solution is injected into the pipe 30*b* of the control rod drive water system 53 from the zirconium injection system 55. The zirconium hydroxide solution may be injected from the upstream side of the pump 114 by closing the valve 112 and opening the valve 114.

Since the control rod drive water system 53 is always operated in any period of starting operation, full power operation and shut-down operation of the nuclear reactor, the zirconium hydroxide solution can be injected into the nuclear reactor during any period of the operations.

In the operating methods of the first to the third embodiments described above, the zirconium hydroxide solution is injected using any one of the nuclear reactor water cleanup system 50, the residual heat removal system 51 or the control rod drive water system 53. However, the zirconium hydroxide solution may be injected into both of the nuclear reactor water cleanup system 50 and the control rod drive water system 53 at a time during full power operation of the nuclear reactor, and may be injected into both of the residual heat removal system 51 and the control rod drive water system 53 at a time during shut-down operation of the nuclear reactor.

A second embodiment of a BWR plant in accordance with the present invention will be described below, referring to FIG. 6. In this embodiment, the ECP is measured, and zirconium hydroxide can be additionally injected based on the change of ECP.

Figure 6:
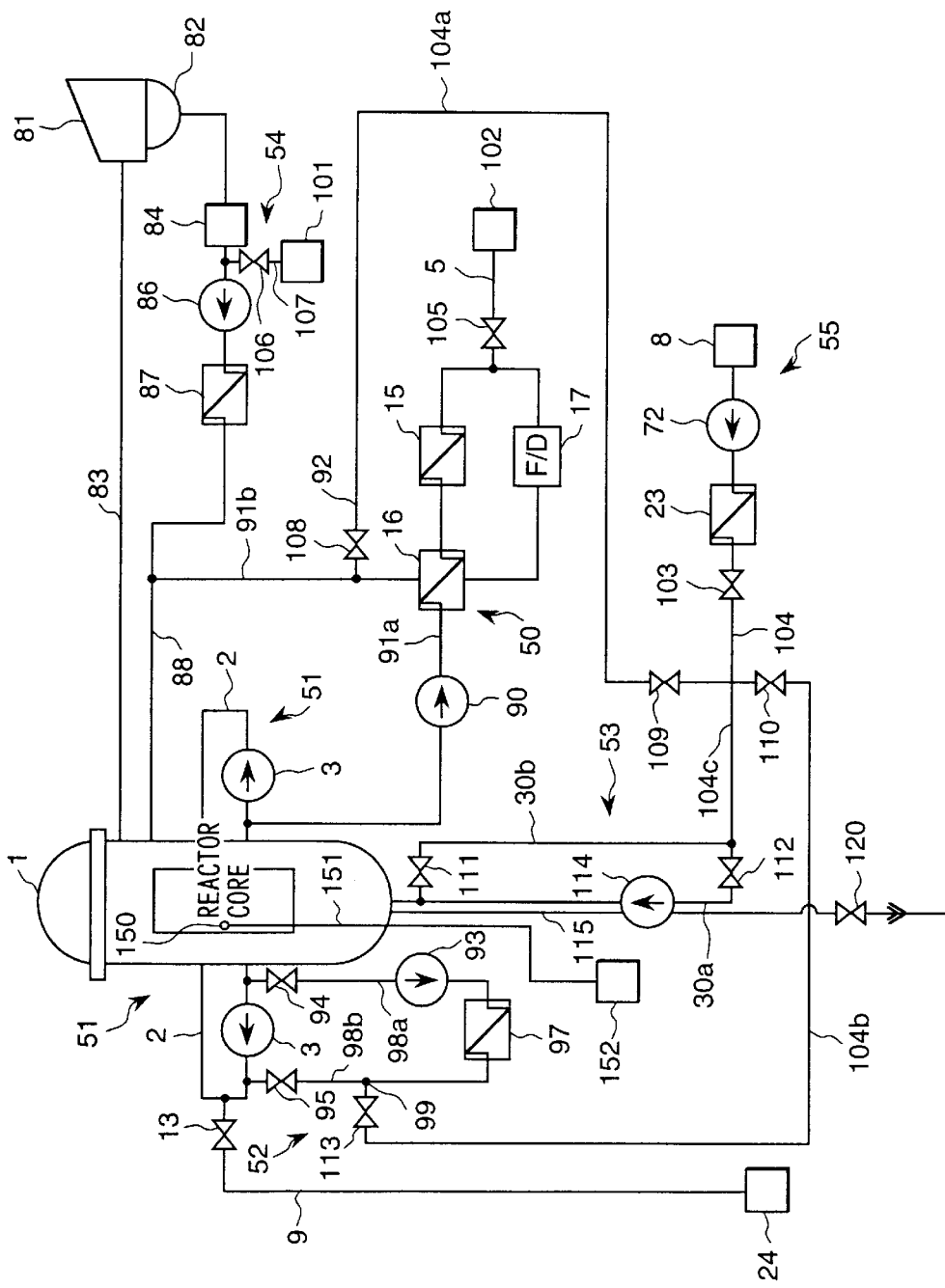
FIG. 6 is a diagram showing the system structure of a second embodiment of a BWR plant in accordance with the present invention.

Referring to FIG. 6, an ECP sensor 150 is attached to a nuclear reactor internal component such as an LPRM (a local power range monitoring system), and an ECP monitoring unit 152 is connected to the ECP sensor 150 through a signal cable 151.

This method of operating the BWR plant is that the ECP during operating the nuclear plant is measured using the ECP sensor 150, the ECP is monitored by the ECP monitoring unit 152, the zirconium hydroxide injection timing in the next time or then on is estimated from the change in ECP, and then the zirconium hydroxide solution is additionally and intermittently injected during operation cycle.

Figure 7:
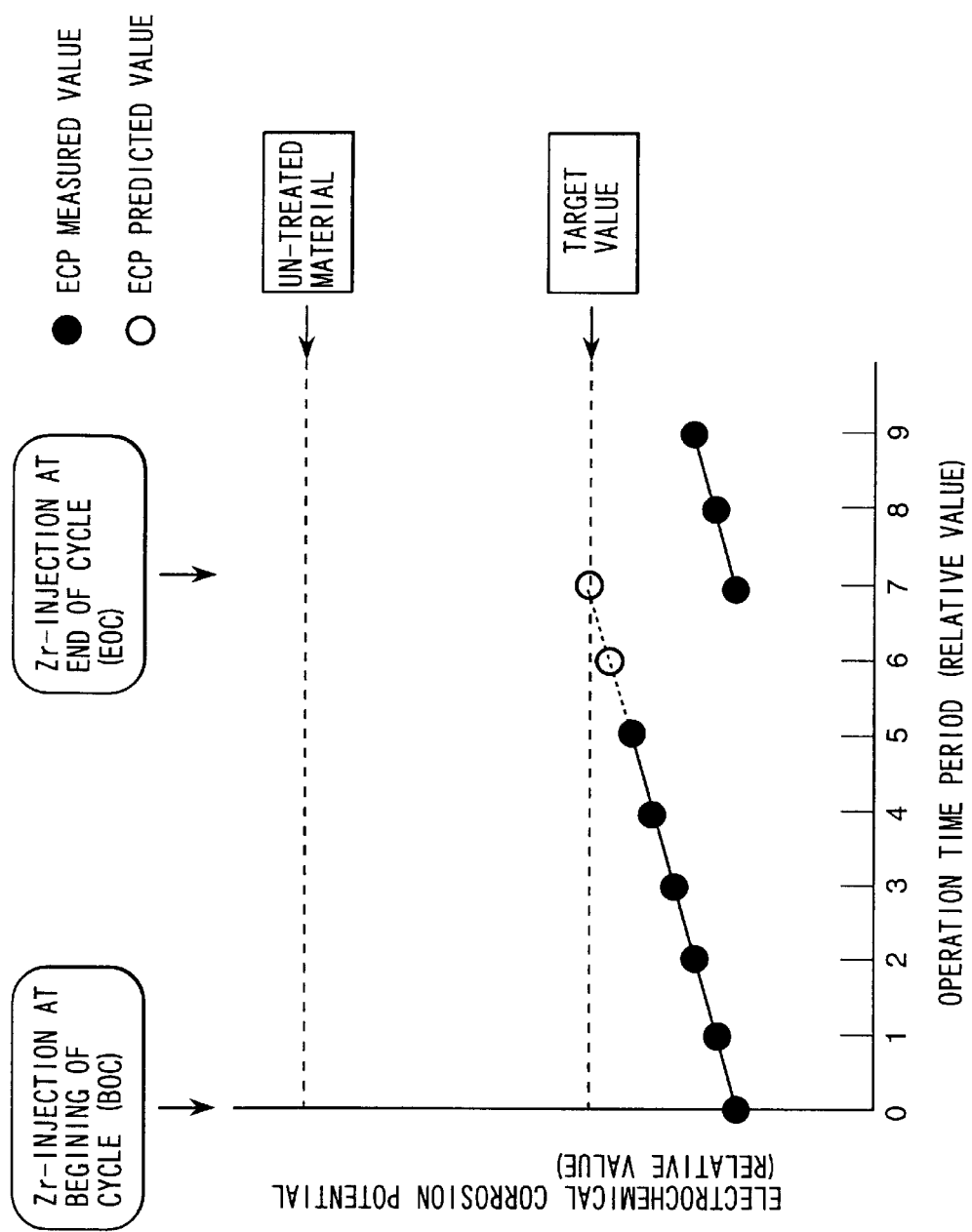
FIG. 7 is a graph explaining an example of a method of operating the BWR plant shown in FIG. 6.

In an example of operation, the measurement is performed every, for example, three month. A measured value of ECP just after injecting zirconium hydroxide and injecting hydrogen is lower than a target value for reducing ECP. However, the measured value of EPC is gradually increased as the operation of the nuclear power plant is continued. This is because the zirconium oxide coating on the surface of component members is gradually peeled off during operation of the nuclear power plant. A timing when the measured value of ECP exceeds the target value of reducing ECP is estimated by extrapolating a degree of increase of ECP in a graph. In an example shown in FIG. 7, zirconium hydroxide is additionally injected at the time 21 moths after initiating ECP measurement. The additional injection is performed by injecting zirconium hydroxide to the nuclear reactor water cleanup system 50, as described in the first embodiment. By repeating this process, the ECP can be maintained below the target value of ECP for a long term.

A third embodiment of a BWR plant in accordance with the present invention will be described below, referring to FIG. 8. In this embodiment, a test pipe line for ECP monitoring and an ECP sensor are provided, and zirconium hydroxide injection is controlled by measuring an ECP of the test pipe line.

Figure 8:
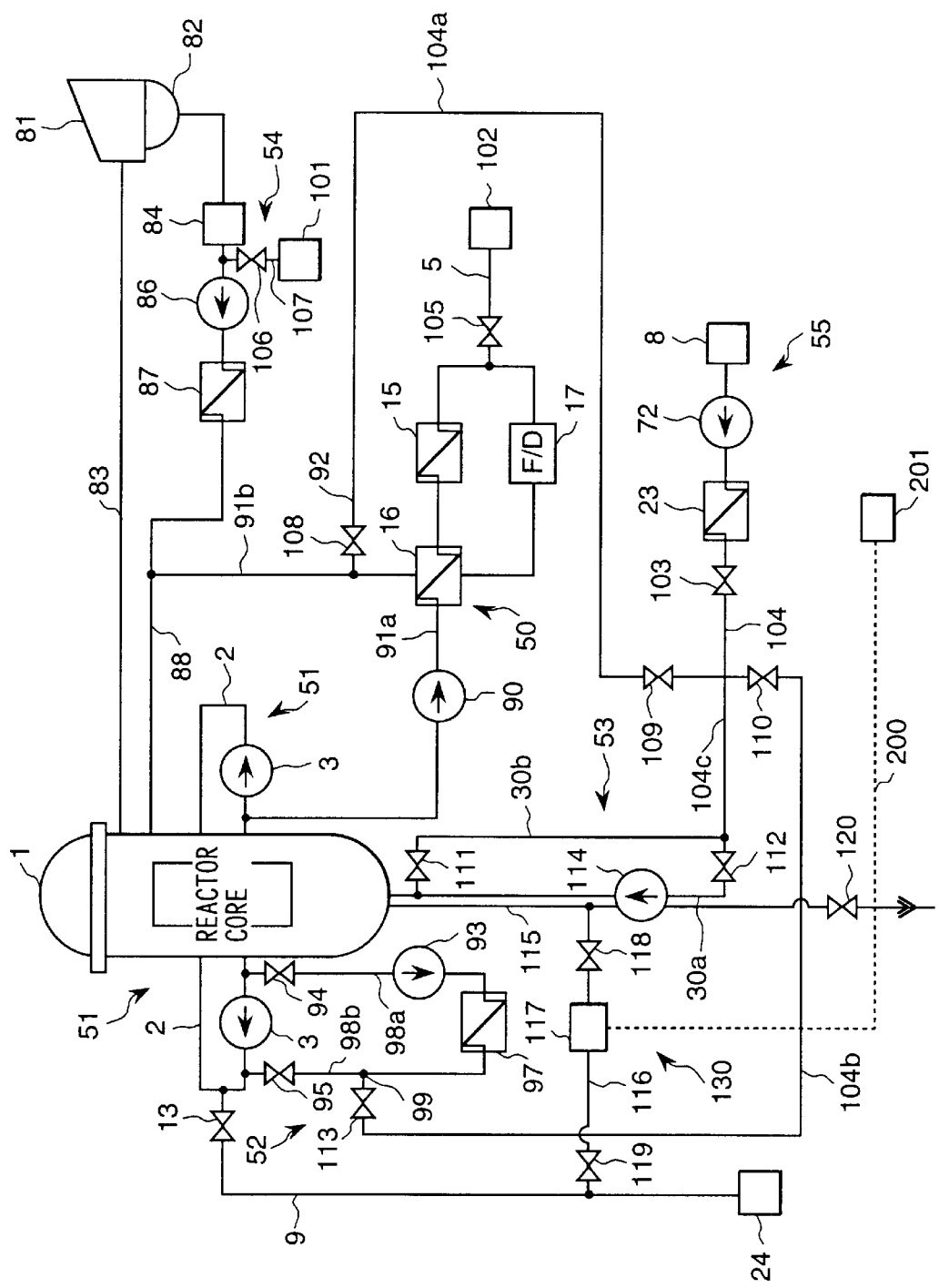
FIG. 8 is a diagram showing the system structure of a third and a fourth embodiments of a BWR plant in accordance with the present invention.

Referring to FIG. 8, an ECP measurement system 130 composed of the test pipe line 116, the ECP sensor 117, valves 118 and 119 is arranged between the bottom drain pipe 115 and the recirculation system sampling pipe 9. The ECP sensor 117 is connected to an ECP monitoring unit 201 through a signal cable 200. These components are installed during a scheduled inspection period of the plant.

It is preferable that the ECP sensor 117 is vertically fixed to the test pipe line 116 by welding. Further, it is preferable that the test pipe line 116 has a surface state (oxidized state) similar to that of the nuclear reactor internal component material. Therefore, it is preferable that a pipe pre-filmed in advance is used for the test pipe line 116. The oxidizing condition is preferably to immerse the pipe for 500 hors or longer in a treatment water of 200 to 300 ppb dissolved oxygen concentration and 250 to 280° C. water temperature.

After setting the ECP measurement system 130, a valve 13 and a valve 120 are closed so that the reactor water may pass through the ECP measurement system 130, and zirconium hydroxide is injected for a preset time period so as to become a preset concentration according to the method described in the first to the third operating examples. After completing zirconium hydroxide treatment, hydrogen injection is performed.

During hydrogen injecting operation, in order to check the effect of zirconium hydroxide injection, the ECP decreasing characteristic of the test pipe line 116 is measured by the ECP sensor 117 and the ECP is monitored by the ECP monitoring unit using the signal cable 200. The ECP monitoring unit 201 also has a converting processing function of a signal transmitted though the signal cable 200.

Figure 9:
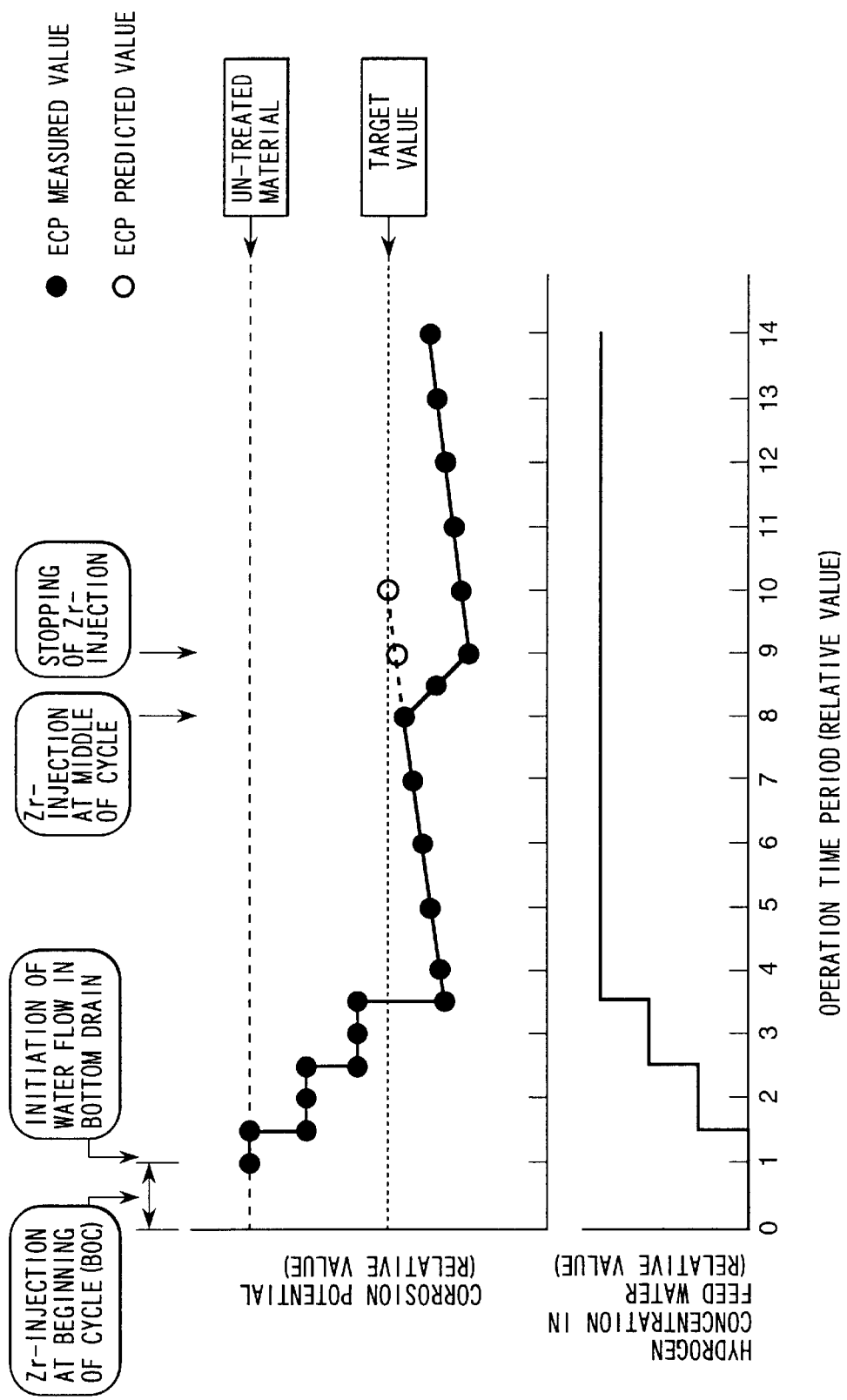
FIG. 9 is a graph explaining an example of a method of operating the BWR plant shown in FIG. 8.

After the zirconium hydroxide treatment, the ECP of the test pipe line 116 is stepwise decreased down to below the target value by hydrogen injection, as shown in FIG. 9.

However, the measured value of ECP is gradually increased as the operation of the nuclear power plant is continued. This is because the zirconium oxide coating on the surface of component members is gradually peeled off during operation of the nuclear power plant. A timing when the measured value of ECP exceeds the target value of reducing ECP is estimated by extrapolating a degree of increase of ECP in a graph. This estimation can be accurately performed by continuing the ECP monitoring with a certain interval even during hydrogen injection operation (hollow circles and a dotted line in the figure). Zirconium hydroxide is additionally injected in synchronism with the estimated timing according to the method described in the first to the third operating examples. By repeating this process, the ECP can be maintained below the target value of ECP for a long term.

Although in this embodiment, hydrogen is injected after injecting zirconium hydroxide at the beginning of operation cycle of the plant, both of zirconium hydroxide and hydrogen may be injected at a time, as shown in FIG. 10.

A fourth embodiment of a BWR plant in accordance with the present invention will be described below, referring to FIG. 8. In this embodiment, a test pipe line treated with zirconium hydroxide in advance and an ECP measurement sensor are installed, and the ECP of the test pipe line is monitored to control the injecting amount of hydrogen and the injecting amount of zirconium hydroxide.

That is, a pipe, which is treated with zirconium hydroxide in a laboratory in advance as the test pipe line 116 of the ECP measurement system 130 shown in FIG. 8, is installed together with the ECP sensor 117.

In this embodiment, the reactor water is not allowed to flow through the ECP measurement system 130 during the period of zirconium hydroxide treatment of the nuclear reactor because the test pipe line 116 is already performed with zirconium treatment.

After completion of the zirconium hydroxide treatment of the nuclear reactor, the valve 13 and the valve 120 are closed to allow the reactor water to flow through the ECP measurement system 130, and an ECP of the test pipe line 116 pre-treated with zirconium is measured.

An amount of hydrogen injected to the feed water is controlled so that the ECP of the test pipe line 116 may become the target value.

When the effect of reducing the ECP of the test pipe line 116 is decreased as the time elapses, the effect of reducing the ECP is maintained by performing zirconium hydroxide injection again while the reactor water is allowed to be flowing also through the ECP measurement system 130.

According to the present invention, in a nuclear power plant, by injecting an amount of hydrogen small enough not to increase a radiation dose rate of the main steam system, ECP of metallic component materials composing a nuclear reactor can be decreased to suppress the potential of occurrence of IGSCC. Further, the control can be easily performed, and the operating cost can be suppressed to increase.

What is claimed is:

1. A method of operating a nuclear power plant for suppressing occurrence of stress corrosion cracking in metallic component materials in contact with reactor cooling water of a nuclear power plant, wherein
    electrochemical corrosion potentials of said metallic component materials are decreased by injecting zirconium hydroxide and hydrogen into said reactor cooling water.

2. A method of operating a nuclear power plant for suppressing occurrence of stress corrosion cracking in metallic component materials in contact with reactor cooling water of a nuclear power plant, wherein
    electrochemical corrosion potentials of said metallic component materials are decreased by injecting zirconium hydroxide and hydrogen into said reactor cooling water, and an injecting amount of said hydrogen, an injecting amount of said zirconium hydroxide and injecting timing of said zirconium hydroxide are controlled so that said electrochemical corrosion potentials may be maintained below a target value.

3. A method of operating a nuclear power plant according to claim 1, wherein said zirconium hydroxide is injected so that a concentration of zirconium in said reactor cooling water may be kept within a range of 0.5 to 50 ppb.

4. A method of operating a nuclear power plant according to claim 1, wherein said zirconium hydroxide is injected so that a concentration of zirconium in said reactor cooling water may be kept within a range of 1 to 6 ppb.

5. A method of operating a nuclear power plant according to claim 1, wherein said hydrogen is injected so that a concentration of hydrogen in reactor cooling water of a water supply system may be kept within a range of 0.1 to 0.6 ppm.

6. A method of operating a nuclear power plant according to claim 1, wherein said hydrogen is injected so that a concentration of hydrogen in reactor cooling water of a water supply system may be kept within a range of 0.3 to 0.5 ppm.

7. A method of operating a nuclear power plant according to claim 1, wherein said metallic component materials are materials selected from the group consisting of stainless steels, nickel based alloys, cobalt based alloys, titanium based alloys, copper based alloys and ferroalloys, nonferrous alloys, carbon steels and low alloy steels.

8. A method of operating a nuclear power plant according to claim 1, wherein said injection of zirconium hydroxide is performed during operating said nuclear power plant at a full power.

9. A method of operating a nuclear power plant according to claim 1, wherein said injection of zirconium hydroxide is performed during shut-down operation of said nuclear power plant.

10. A method of operating a nuclear power plant according to claim 1, wherein said injection of hydrogen is initiated after completion of said injection of zirconium hydroxide.

11. A method of operating a nuclear power plant according to claim 1, wherein an electrochemical corrosion potential of said metallic component material is monitored when said hydrogen is injected, and zirconium hydroxide is additionally injected during operating said nuclear power plant at full power based on the monitored result.

12. A method of controlling water chemistry of a nuclear power plant, wherein in order to suppress occurrence of stress corrosion cracking in metallic component materials in contact with reactor cooling water of a nuclear power plant, zirconium hydroxide is injected into said reactor cooling water before injecting hydrogen into said reactor cooling water.

13. A method of controlling water chemistry of a nuclear power plant according to claim 12, wherein said zirconium hydroxide is injected so that a concentration of zirconium in said reactor cooling water may be kept within a range of 0.5 to 50 ppb.

14. A method of operating a nuclear power plant for suppressing occurrence of stress corrosion cracking in metallic component materials in contact with reactor cooling water of a nuclear power plant, wherein
zirconium hydroxide and hydrogen are injected into said reactor cooling water.

15. A method of operating a nuclear power plant for suppressing occurrence of stress corrosion cracking in metallic component materials in contact with reactor cooling water of a nuclear power plant, wherein
zirconium hydroxide and hydrogen are injected into said reactor cooling water, and an injecting amount of said hydrogen, an injecting amount of said zirconium hydroxide and injecting timing of said zirconium hydroxide are controlled so that said electrochemical corrosion potentials may be maintained below a target value.

* * * * *